United States Patent [19]

Davis

[11] Patent Number: 4,987,860
[45] Date of Patent: Jan. 29, 1991

[54] SMALL ANIMAL BATH

[76] Inventor: Brad S. Davis, 2445 Juan St., San Diego, Calif. 92110

[21] Appl. No.: 531,556

[22] Filed: Jun. 1, 1990

[51] Int. Cl.$^5$ .............................................. A61D 11/00
[52] U.S. Cl. .................................................. 119/158
[58] Field of Search ................. 119/96, 156, 158, 159, 119/160

[56] References Cited

U.S. PATENT DOCUMENTS 1,335,629  3/1920  Woudema ........................... 119/160
1,559,750  11/1925  Hemm et al. ..................... 119/160 X Primary Examiner—Gene Mancene
Assistant Examiner—R. Thomas Price
Attorney, Agent, or Firm—Selwyn S. Berg

[57] ABSTRACT

A device is described particularly suited for the bathing of pet cats and small dogs. Research has indicated that a cat bath which is made of transparent material and so dimensioned and designed to permit the cat to grasp an upper section of said bath with its forepaws tends to pacify the animal. In addition, the bath has variable size patterns which serves as a aperture through which the cat can put its head but not its shoulders. The bathing container has an agitator and a ring spray which keeps the water in motion about the animal. Research has indicated that the width and breadth of said cat bath must be less than the length of the average cat and the height of the container approximately the length of an average cat. When the animal is placed into the container and liquid admitted, the animal stands on its rear paws with its forepaws grasping the upper section of the bath and its head out of the aperture. Because of the different sizes of animals which must be accommodated, an assortment of patterns is supplied to create the head aperture assuring that the animal will not escape. The animal is restrained because it cannot get its shoulders through the selected pattern. It has been discovered that the animal ceases to panic once it gets its head through the aperture.

1 Claim, 2 Drawing Sheets

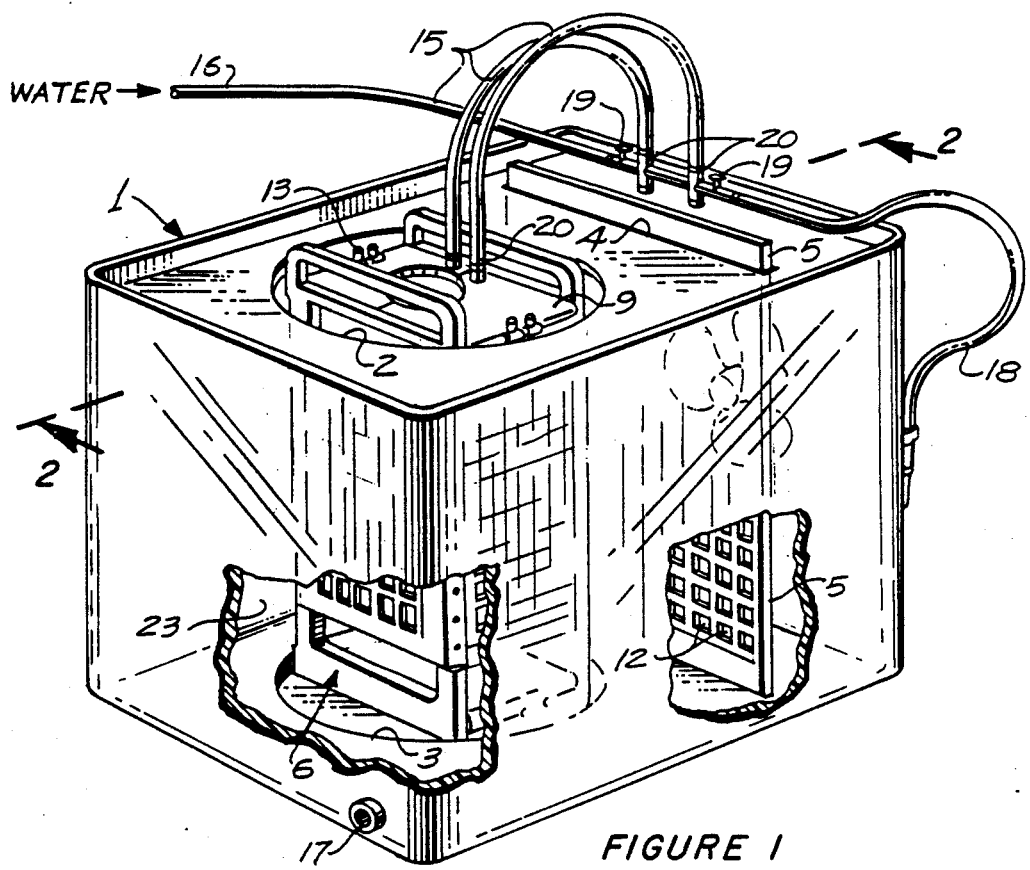
FIGURE 1
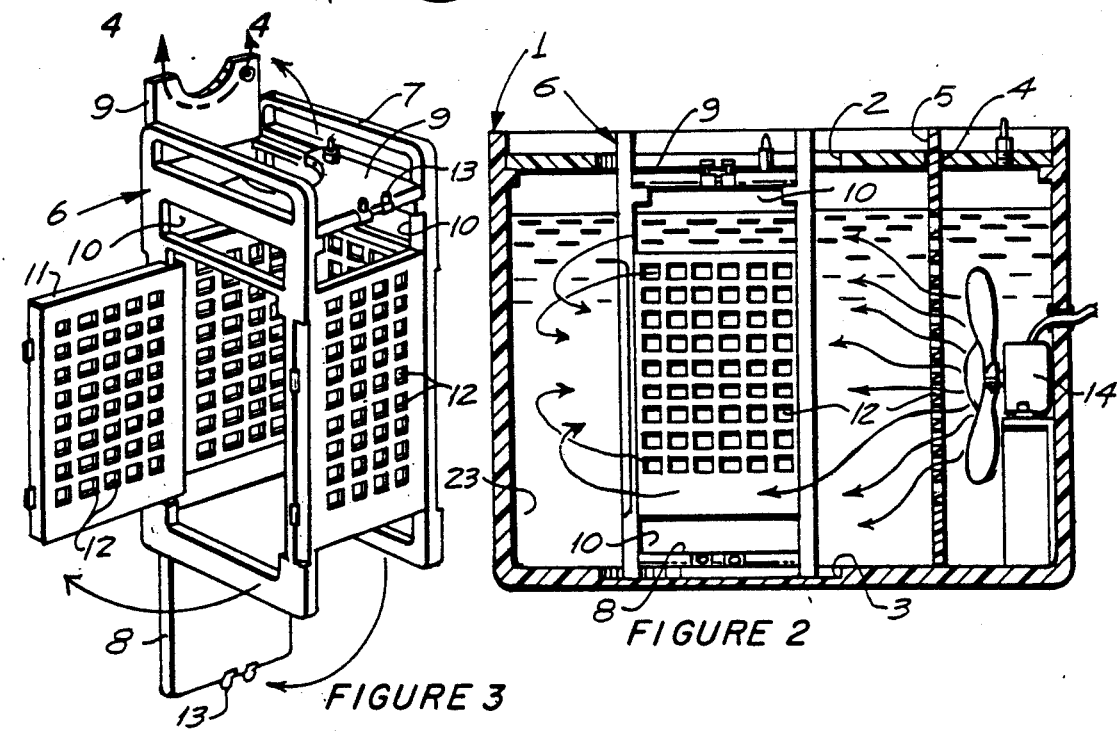
FIGURE 3
FIGURE 2

SMALL ANIMAL BATH

SUMMARY

Many small animals are not amenable to baths. In particular, cats dislike baths. Though it is true that most cats bathe themselves, there are occasions on which members of the feline family must be washed with soap and water and rinsed with other solutions to rid them of fleas or odors acquired from, say, unfortuitous confrontations with skunks.

The Inventor had many negative experiences attempting to bathe his pet cat. In particular, he found he could not pacify the cat to enjoy being immersed in a pan of water. However, he discovered that the cat became a bit more docile if it was able to put its forepaws up at some high point while standing up on the backpaws. A number of containers were designed in order to find some optimum dimensions for a bath container. It was also discovered that if the cat found it uncomfortable to withdraw its body into the container, it experienced less anxiety and was more likely to keep its head up through the opening than attempting to withdraw inside the container. As a result, the bathing container should be nearly as high as the average length of a cat but have width and breadth which is approximately one-half the length of the cat.

It was also discovered that cats are more amenable to being placed into transparent containers than opaque ones. A restraining system was devised which constitutes a series of patterns which are appropriately dimensioned and designed holes through which the cat can place its head, but not its shoulders. As mentioned, this bath is adequate for all animals. However, the invention evolved because of unique cat problems.

The animal is placed into a container which is designated a DIP BASKET through a hinged side which can be snapped shut. The top houses a (pattern which has the aperture) through which the animal can poke its head. The animal is able to support itself upright on its hind paws by placing its forepaws on a grasp near the top of the dip basket. The cat will put its head through the portal of the pattern on the top of the container. The container is then filled with liquid and agitator and a ring spray move the water about thoroughly cleansing the fur of the animal immersed in the liquid and contained within the enclosure.

BRIEF DESCRIPTION OF THE DRAWINGS

FIG. 1. Perspective view of cat bath.
FIG. 2. A cross-sectional view of line 2—2.
FIG. 3. Perspective view of DIP BASKET.

DESCRIPTION OF EMBODIMENT

Figure 4:
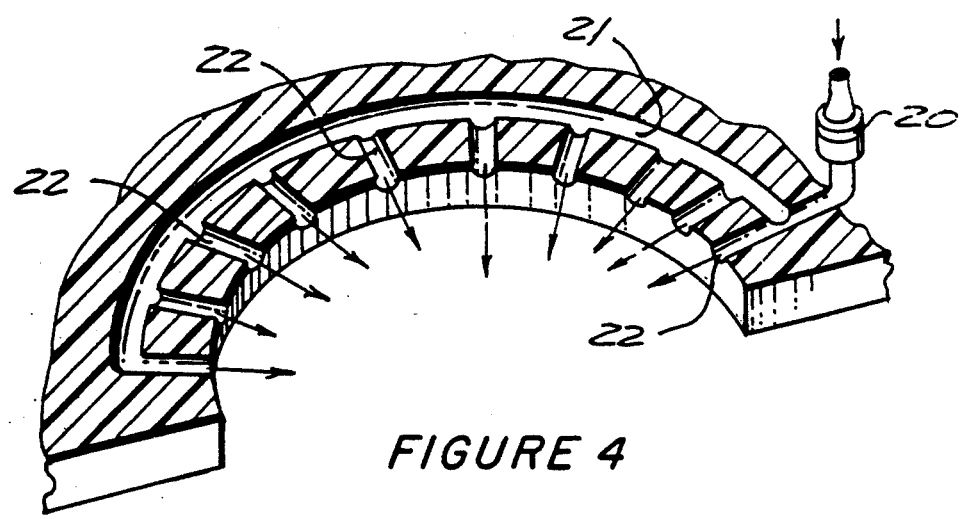
FIG. 4. Detail of neck spray and head aperture pattern.

As shown in FIG. 1, the cat bath is primarily a transparent container (1) which is designed to be water tight. FIG. 3 shows the embodiment featuring a nesting "DIP BASKET"(6). The animal access (11) of the dip basket is opened in order to insert the animal. The animal access must be large enough to admit an animal. The top of the dip basket has a pattern (9) which permits the head of the animal to pass but prevents penetration of the shoulders of the animal. The dip basket (6) divides the container into a reservoir section (23) and the section for holding the animal. This dip basket has at least one side (12) with an upper edge on the dip basket (6) constituting a paw grasp (10). In the reservoir section there is an agitator (14) for gently moving the liquid media. The sides (12) of the dip basket (6) are of a grating design to permit the free flow of liquid from the reservoir into the portion which houses the animal. To accommodate smaller animals, the dip basket must be made shallower. This may be done by lifting the bottom platform, (8). The bottom platform (8) has several clip means which permits attachment of the bottom platform to the sides of the dip basket at various locations. A typical clip means was a "U" shaped clip which was screwed into the platform and wrapped around the solid bridging between the holes (12) in the side of the dip basket. This same clip means was used elsewhere in the invention, and permitted a hinged effect when the component was only held by one side. For clarity, the clip means (12) is shown holding the bottom platform (8) at its lowest positions in FIGS. 1, 2 and 3. However, the same clip means were also used to hold that bottom platform and other positions higher up in the dip basket. Though not shown, it is also possible to insert other space fillers in the animal portion so as to restrict the width and breadth of the animal portion to appropriate dimensions for smaller animals to assure that such small animals will not be able to comfortably withdraw their full body into the width and breadth of the part which contains the animal. In the embodiment using grating partitions, it is easy to interlock such spacers into the dip basket. Such inner dimensioning partitions must be rigid enough to support the animal.

There is appropriate plumbing which is a system of valves, tubes, disconnects and the like connected to a water bibs (20). A ring spray, detailed in FIG. 4, assures that the animal is rinsed thoroughly from the neck down. When an animal is washed, fleas tends to congregate in the neck sections. As aforementioned, there are a number of different sized patterns which are sized to permit the penetration of the animal head not the penetration of its shoulders. These patterns create the appropriate aperture, and the operator of the bath selects and attaches the pattern which gives the operator the appropriate sized aperture. The ring spray assures a penetrating wash and rinse through the jets (22). Note the dip basket may be rotated in seat (3).

The cat is placed into the dip basket through the opening side (11). The top of the container (1) permits the insertion of the dip basket (6) through the container access hole (2). The animal has been encouraged to enter the dip basket, which is closed and lowered by handles attached to the dip basket (6) into the container through the container aperture. The animal has its head penetrating animal head pattern (9). It is important that the container be transparent. The cat will intuitively place its forepaws on the paw grasp (10) and poke its head out through the aperture pattern (9). If the animal be too short to be able to insert its head completely through said aperture, the bottom of the dip basket may be raised by the repositioning of the platform (8) which engages the sides of dip basket. The aperture pattern must be set in accordance with the size of the head of the animal and its shoulders. The pattern must be dimensioned so that the animal will get its head through, but not its shoulders. Liquid is then admitted to the container to some appropriate level through the plumbing system of inlet (16), valves (19), and wash hose (18). Necessary detergents or insecticides may be mixed into the water. At an appropriate time the agitator (14) is started which causes the water to flow gently around the animal which will maintain its position on outstretched rear paws with front paws grasping the paw grasps on the top sides of the dip basket which separates the reservoir and the animal enclosure section. The dip basket may be rotated in seat (3) to assure a through rinse; the neck of the animal may be saturated with liquid from the ring spray about the head pattern by admitting liquid through the fittings (20), into the spray ring channel (21) out the jets (22). Though a single head pattern will cover most circumstances, because of the critical nature of the sizing of the pattern to the animal, additional patterns will be available and replaceable through the use of appropriate disconnect hinges (13). Of course the system has appropriate venting holes (12) and a agitator guard (5) held in a slot (4) to assure safety.

The discovery of the necessity of the paw grasp and the utilization of transparent materials for this cat bath is critical.

It is possible to use multiplicity of agitators as well as inner dimensioning partitions to properly dimension the animal section of the dip basket so as to encourage the animal to stand upright. Extensive experience with this device has shown that the animal preferentially places its head through the aperture. If the head aperture is too large, the animal will attempt to get its paw and shoulder through. If it does not succeed in getting its shoulder through, the animal settles back in an upright position on its hind paws with its forepaws on the paw grasp on the top edge of the dip basket.

I claim:

1. A liquid bath for a small animal comprising
   a transparent outer container which has liquid tight sides and bottom,
   a removable top which may be affixed to said transparent outer container,
   said removable top having an access hole,
   an agitator means incorporated into said transparent outer container to move said liquid,
   a dip basket of four penetrable sides, a moveable bottom platform, and a top,
   said top with an aperture to accommodate the passage of said small animal head,
   a spray ring circumscribing said aperture,
   a multiplicity of tubes, connectors and valves interconnecting said spray ring with external plumbing to permit the flow of liquid into said spray ring and into said transparent outer container,
   said penetrable sides of an open grid design permitting free-flow of said liquid through said penetrable sides,
   a paw grasp at the top of said penetrable sides,
   said moveable bottom platform of said dip basket having a clip means to attach said moveable platform to said penetrable sides so the dimensions of said dip basket may be restricted and said animal can rest its front paws on said paw grasp while standing upright on said movable bottom in said dip basket,
   said dip basket insertable into said access hole of transparent outer container
   so that when said small animal is placed into said dip basket which has been properly dimensioned, said animal will be constrained to stand in an upright position with its forepaws on said paw grasp of said dip basket with said animal poking its head out through said aperture which is large enough to admit said animal head but not the shoulders of the animal,
   then said container can be filled with liquid which is sprayed and agitated about said animal who is held captive in the bath system described above.

* * * * *